United States Patent [19]

Narayan

[11] 4,110,270

[45] Aug. 29, 1978

[54] PROCESS FOR THE PREPARATION OF FOAMS CHARACTERIZED BY ISOCYANURATE AND URETHANE LINKAGES

[75] Inventor: Thirumurti Narayan, Riverview, Mich.

[73] Assignee: BASF Wyandotte Corporation, Wyandotte, Mich.

[21] Appl. No.: 794,174

[22] Filed: May 5, 1977

[51] Int. Cl.$^2$ .................... C08G 18/22; C08G 18/14; C08G 18/48
[52] U.S. Cl. .................................... 521/121; 521/170; 521/902
[58] Field of Search .................. 260/2.5 AW, 2.5 AB, 260/77.5 NC

[56] References Cited

U.S. PATENT DOCUMENTS

| | | | |
|---|---|---|---|
| 3,628,872 | 12/1971 | Ashida | 260/77.5 NC |
| 3,943,075 | 3/1976 | Fishbein | 260/2.5 AB |

*Primary Examiner*—C. Warren Ivy
*Attorney, Agent, or Firm*—Joseph D. Michaels; Bernhard R. Swick; Robert E. Dunn

[57] ABSTRACT

Foams characterized by isocyanurate and urethane linkages are prepared by condensing: (a) an organic polyisocyanate with a polyol or (b) a quasi-prepolymer in the presence of a blowing agent and a catalytically effective amount of an alkali metal salt of an organic sulfinic acid. The catalysts of the invention offer the advantages of longer cream times and fully cured foams in acceptable times thus finding particular utility in pour-in-place and slab stock foaming applications.

8 Claims, No Drawings

PROCESS FOR THE PREPARATION OF FOAMS CHARACTERIZED BY ISOCYANURATE AND URETHANE LINKAGES

BACKGROUND OF THE INVENTION

1. Field of the Invention

The present invention relates to a process for the preparation of foams characterized by isocyanurate and urethane linkages, commonly known as urethane-modified polyisocyanurate foams. More particularly, the invention relates to a novel catalyst system for the preparation of these foams.

2. Prior Art

The preparation of foams characterized by isocyanurate and urethane linkages is well known in the art. Generally, these foams are prepared by reacting an organic polyisocyanate with a polyol in the presence of a catalyst which promotes the urethane reaction and a catalyst which promotes the trimerization reaction. The foams may also be prepared by condensing in the presence of a trimerization catalyst, an isocyanate-terminated quasi-prepolymer obtained by the reaction of an organic polyisocyanate with a polyol. Several catalysts are known in the art to promote the trimerization of isocyanate groups. Examples of these catalysts are: (a) organic strong bases, (b) tertiary amine co-catalyst combinations, (c) Friedel-Crafts catalysts, (d) basic salt of carboxylic acids, (e) alkali metal oxides, alkali metal alcoholates, alkali metal phenolates, alkali metal hydroxides and alkali metal carbonates, (f) onium compounds from nitrogen, phosphorous, arsenic, antimony, sulfur and selenium, and (g) monosubstituted monocarbamic esters.

Generally, the use of the above catalysts results in formulations having short cream times, particularly when reactive primary hydroxy-terminated polyols are employed in the formulations. This does not lend the formulations to be of use in pour-in-place and slab stock foaming applications. It is to overcome the aforesaid shortcomings of the prior art operations that the present invention is directed.

SUMMARY OF THE INVENTION

The present invention relates to the use of alkali metal salts of organic sulfinic acids as trimerization catalysts for isocyanate groups. Use of the catalysts of the subject invention offers latent catalytic effect even when using very reactive polyols, i.e., primary hydroxy-terminated polyols in the foam formulation.

DESCRIPTION OF THE PREFERRED EMBODIMENTS

The alkali metal salts of organic sulfinic acids, which are of use in the process of the subject invention may be represented by the formula:

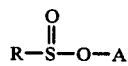

wherein A is sodium or potassium and R is aryl, alkyl of from 1 to 16 carbon atoms, alkaryl of from 1 to 4 carbon atoms in the alkyl chain, alkoxyaryl having from 1 to 4 carbon atoms in the alkoxy chain, dialkylaminoaryl and dialkylaminoalkyl having from 1 to 4 carbon atoms in the alkyl chains. Representative catalysts include the sodium and potassium salts of the following sulfinic acids: methyl, ethyl, n-propyl, isopropyl, n-butyl, isobutyl, n-hexyl, n-heptyl, n-octyl, n-nonyl, n-decyl, n-undecyl, dichloromethyl, trichloromethyl, benzene, toluene, 2,4-dimethylbenzene, 2,5-dimethylbenzene, 3,4-dimethylbenzene, 2,4,6-trimethylbenzene, 2,4,6-tripropylbenzene, 2,4-diethylbenzene, 2,5-diethylbenzene, 4-methoxybenzene, 4-phenoxybenzene, 2,5-diethoxybenzene, 2-thiophene, 2-naphthalene, 2-dimethylaminobenzene, 2,4-bis(dimethylamino)benzene, 2-(N-methylhydroxyethylamino)benzene, dimethylaminopropyl and diethylaminopropyl. Generally from 0.1 part to 15 parts of catalyst per equivalent of polyisocyanate will be employed in the process of the invention.

The organic polyisocyanate used in the preparation of the foams in the process of the subject invention corresponds to the formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'-5,5'-tetraisocyanate, and the like; arylalkyl polyisocyanates such as xylylene diisocyanate; aliphatic polyisocyanates such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20% to 40% by weight.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxy-terminated polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines as well as mixtures thereof. Compounds which contain two or more different groups within the abovedefined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxy groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639; and 3,823,201, the discosures of which are hereby incorporated by reference.

Also polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred compounds are those having an equivalent weight between 100 and 1500.

As mentioned above, the process of the subject invention can be carried out by condensing an organic polyisocyanate in the presence of a polyol. Any of the organic compounds containing at least two active hydrogen-containing groups reactive with an isocyanate group described above in connection with the preparation of the "quasi-prepolymers" may be employed in the subject invention. Generally, the amount of polyol employed will be from about 0.01 to 0.8 equivalent, preferably from 0.1 to 0.7 equivalent per equivalent of organic polyisocyanate.

When a polyol is employed in the process of the subject invention, a urethane catalyst may also be employed. Urethane catalysts which may be employed are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01% to 10% by weight based on the weight of organic polyisocyanate.

The foams of the present invention are prepared by mixing together the organic polyisocyanate, the polyol or the quasi-prepolymer, a blowing agent and the catalysts at an initiating temperature which, depending on the catalyst, will range from about 0° C. to 50° C. The present invention also contemplates the incorporation of additional ingredients in the foam formulation to tailor the properties thereof. Thus, plasticizers, surfactants, such as the silicone surfactants, e.g. alkylpolysiloxanes, may be employed in the invention. Further additional ingredients include auxiliary or supplemental trimerization catalysts and carbodiimide-promoting compounds. Also, inorganic fillers, pigments and the like can be used.

In any event, the foams prepared in accordance herewith are rigid cellular products having a density of from about one pound to forty pounds per cubic foot which exhibit excellent strength and flame properties, such as fire resistance, low smoke evolution, and excellent weight retention.

Following are specific, non-limiting examples which are provided to illustrate the enumerated principles described herein. All parts are by weight unless otherwise indicated. In the Examples which follow, the following abbreviations are employed:

MDI — crude diphenylmethane diisocyanate
TDH — 1,3,5-tris(N,N-dimethylaminopropyl)-s-hexahydrotriazine
DC-193 — polyalkylsiloxane-polyoxyalkylene copolymer, a foam stabilizer
F-11B — trichlorofluoromethane
SBS — sodium benzenesulfinate
STS — sodium toluenesulfinate
PBS — potassium benzenesulfinate
PA — potassium acetate
DBTDA — dibutyltin diacetate
DBTDL — dibutyltin dilaurate
Polyol A — a polyol prepared by the reaction of ethylene oxide with trimethylolpropane, said polyol having an equivalent weight of 250.
Polyol B — an ester-containing polyol prepared by the reaction of propylene oxide with the product of the reaction of one mole of tetrabromophthalic anhydride with one mole of the propylene oxide adduct of pentaerythritol, said polyol having an equivalent weight of 235.
Polyol C — an ester-containing polyol prepared by the reaction of propylene oxide with the product of the reaction of equal moles of chlorendic anhydride and propylene glycol, said polyol having an equivalent weight of 290.
Polyol D — a polyol prepared by the reaction of ethylene oxide with the propylene oxide adduct of sucrose, said polyol having an equivalent weight of 490 and an oxyethylene content of 67% by weight.
Polyol E — a polyol prepared by the reaction of propylene oxide with sorbitol, said polyol having an equivalent weight of approximately 120.

In addition, the physical properties of the foams were determined in accordance with the following test methods:

Density — ASTM D - 1622–63
K-factor — ASTM C - 518
Compression strength — ASTM D - 1621–3
Tumbling friability — ASTM C - 421
Flame retardancy — ASTM D - 3014
Smoke density — NBS smoke density test Also, the presence of isocyanurate and urethane linkages in the foams was confirmed by infrared spectroscopic analyses.

EXAMPLE I

A series of foams was prepared by mixing in a vessel at high speed, a stream of polyisocyanate and blowing agent, and a stream containing a polyol, catalyst, and surfactant. Thereafter the resulting mixture was cast in a mold and the foams were allowed to free rise. The ingredients employed, amounts thereof, and reactivity profiles of the formulations are presented in Table I, below.

As the data in the Table indicate, the catalysts of the subject invention offer latent catalytic effect, i.e., longer cream and gel times, yet fully cured foams (tack-free time) in acceptable times.

Table I

| INGREDIENTS | Parts | | | | |
|---|---|---|---|---|---|
| | A | B | C | D | E |
| MDI | 100 | 100 | 100 | 100 | 100 |
| F-11B | 25 | 25 | 25 | 25 | 25 |
| DC-193 | 1 | 1 | 1 | 1 | 1 |
| Polyol A | 20 | 20 | 20 | 20 | 20 |
| Ethylene Glycol | 4 | 4 | 3 | 4 | 3 |
| TDH | 2 | — | — | — | — |
| DMP-30 | — | 2 | — | — | — |
| PA | — | — | 1 | — | — |
| SBS | — | — | — | 2 | — |
| STS | — | — | — | — | 2 |

| Reactivity | Foam | | | | |
|---|---|---|---|---|---|
| | A | B | C | C | E |
| Cream time, seconds | 5 | 11 | 13 | 32 | 17 |
| Gel time, seconds | 16 | 125 | 20 | 45 | 36 |
| Rise time, seconds | 40 | 50 | 38 | 95 | 150 |
| Tack-free time, seconds | 40 | 240 | 20 | 90 | 145 |
| Density, pounds per cubic foot | 1.7 | Foam collapsed. | 2.0 | 1.7 | 2.1 |

EXAMPLES II-IX

A series of foams was prepared in the manner described in Example I. The ingredients employed, amounts thereof, as well as the reactivity profile and physical properties of the resulting foams are presented in Table II, below.

Table II

|  | Example | | | | | | | |
|---|---|---|---|---|---|---|---|---|
|  | II | III | IV | V | VI | VII | VIII | IX |
| INGREDIENTS, parts | | | | | | | | |
| MDI | 200 | 200 | 200 | 200 | 200 | 200 | 200 | 200 |
| F-11B | 50 | 50 | 50 | 50 | 50 | 50 | 50 | 50 |
| Polyol A | 30 | 30 | 30 | 30 | 30 | 30 | — | — |
| Polyol B | 10 | 10 | 10 | 10 | 10 | 10 | 10 | 10 |
| Polyol D | — | — | — | — | — | — | 30 | 30 |
| SBS | 3.75 | 4.5 | 3.75 | 3.75 | 3.75 | 5.6 | 4.5 | 4.5 |
| Ethylene Glycol | 6.25 | 7.5 | 6.25 | 6.25 | 6.25 | 9.4 | 7.5 | 7.5 |
| DC-193 | 2 | 2 | 2 | 2 | 2 | 2 | 2 | 2 |
| TDH | — | — | — | 0.2 | — | — | — | — |
| DBTDA | — | — | 0.1 | — | — | — | — | 0.1 |
| DBTDL | — | — | — | — | 0.2 | — | — | — |
| Reactivity, seconds | | | | | | | | |
| Cream time | 35 | 31 | 12 | 20 | 13 | 28 | 30 | 8 |
| Gel time | 60 | 50 | 30 | 37 | 28 | 51 | 50 | 28 |
| Rise time | 95 | 90 | 65 | 60 | 50 | 85 | 88 | 50 |
| Tack-free time | 220 | 180 | 120 | 120 | 81 | 90 | 90 | 95 |
| Physical Properties Of Foam Of Example: | | | | | | | | |
| Density, pounds per cubic foot | 2.1 | 2.0 | 1.9 | 1.7 | 1.8 | 1.9 | 2.2 | 1.6 |
| K-factor, initial | 0.127 | 0.125 | 0.125 | 0.128 | 0.125 | 0.117 | 0.122 | 0.123 |
| Compr. str., 10% Defl., psi. | 30 | 28 | 26 | 22 | 23 | 10 | 10 | 21 |
| Friab., Wt. Loss % | 24 | 20 | 13 | 22 | 16 | 22 | 23 | 31 |
| Butler Chimney Test | | | | | | | | |
| Wt. Ret., % | 82 | 83 | 79 | 80 | 73 | 78 | 84 | 81 |
| Flame Ht., in. | 7 | 9 | 9 | 8 | 9 | 9 | 9 | 8 |
| Time to SX, sec. | 10 | 10 | 12 | 18 | 21 | 10 | 13 | 10 |
| NBS Smoke Density | 120 | 110 | 119 | 69 | 95 | 124 | 116 | 72 |

EXAMPLES X-XVI

A series of foams was prepared in the manner described in Example I. The ingredients employed, amounts thereof, as well as the reactivity profile and physical properties of the resulting foams are presented in Table III, below.

Table III

|  | Example | | | | | | |
|---|---|---|---|---|---|---|---|
|  | X | XI | XII | XIII | XIV | XV | XVI |
| INGREDIENTS, parts, | | | | | | | |
| MDI | 200 | 200 | 200 | 200 | 200 | 200 | 200 |
| F-11B | 40 | 40 | 40 | 40 | 40 | 55 | 55 |
| Polyol A | 40 | 30 | 40 | 30 | — | — | 30 |
| Polyol B | — | 10 | — | 10 | 10 | 10 | — |
| Polyol C | — | — | — | — | — | — | 30 |
| Polyol E | — | — | — | — | 30 | 30 | — |
| STS | 4 | 4 | 4 | 4 | 4 | 4 | — |
| PBS | — | — | — | — | — | — | 2 |
| Ethylene Glycol | 6 | 6 | 6 | 6 | 6 | 6 | 2 |
| DC-193 | 2 | 2 | 2 | 2 | 2 | 2 | 4 |
| Reactivity, seconds | | | | | | | |
| Cream time | 16 | 21 | 20 | 28 | 28 | 95 | 14 |
| Gel time | 21 | 40 | 38 | 50 | 50 | 150 | 42 |
| Tack-free time | 114 | 115 | 120 | 125 | 165 | 180 | 115 |
| Rise time | 80 | 105 | 90 | 110 | 115 | 170 | 75 |
| Physical Properties Of Foam Of Example: | | | | | | | |
| Density, pounds per cubic foot | 1.8 | 2.0 | 1.8 | 1.9 | 2.1 | 2.0 | 2.3 |
| K-factor, initial | 0.146 | 0.132 | 0.135 | 0.129 | 0.136 | 0.129 | 0.110 |
| K-factor, aged 10 days at 140° F. | 0.199 | 0.154 | 0.159 | 0.152 | 0.165 | 0.153 | 0.151 |
| Compr. str., 10% Defl., psi. | 31 | 30 | 27 | 32 | 29 | 31 | 25 |
| Friab., Wt. Loss % | 28 | 22 | 23 | 18 | 27 | 33 | 4 |
| Butler Chimney Test | | | | | | | |
| Wt. Ret., % | 77 | 82 | 84 | 82 | 84 | 57 | 75 |
| Flame Ht., in. | 10 | 10 | 10 | 10 | 10 | 10 | 10 |
| Time to SX, sec. | 17 | 11 | 12 | 11 | 11 | 19 | 13 |
| NBS Smoke Density | 64 | 111 | 49 | 93 | 119 | 140 | 98 |

The embodiments of the invention in which an exclusive property or privilege is claimed are defined as follows:

1. In a process for the preparation of a pour-in-place urethane-modified isocyanurate foam by the reaction of an organic polyisocyanate with a primary hydroxyterminated polyol in the presence of a blowing agent and a trimerization catalyst the improvement which comprises employing as catalyst for the reaction an alkali metal salt of toluene- or benzenesulfinic acid.

2. The process of claim 1 wherein the alkali metal salt is sodium benzenesulfinate.

3. The process of claim 1 wherein the alkali metal salt is potassium benzenesulfinate.

4. The process of claim 1 wherein the alkali metal salt is sodium toluenesulfinate.

5. The process of claim 1 wherein the organic polyisocyanate is diphenylmethane diisocyanate.

6. The process of claim 1 wherein the polyol is an ethylene oxide adduct of a polyhydric alcohol.

7. The process of claim 6 wherein the polyhydric alcohol is trimethylolpropane.

8. The process of claim 1 wherein the blowing agent is a fluorocarbon.

* * * * *